US008838743B2

(12) United States Patent
Lewites et al.

(10) Patent No.: US 8,838,743 B2
(45) Date of Patent: Sep. 16, 2014

(54) APPARATUS AND METHOD FOR A DYNAMICALLY EXTENSIBLE VIRTUAL SWITCH

(75) Inventors: Saul Lewites, Aloha, OR (US); Ajay Garg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1570 days.

(21) Appl. No.: 10/779,083

(22) Filed: Feb. 13, 2004

(65) Prior Publication Data
US 2005/0182853 A1    Aug. 18, 2005

(51) Int. Cl.
| | |
|---|---|
| G06F 15/16 | (2006.01) |
| G06F 15/173 | (2006.01) |
| H04L 12/931 | (2013.01) |
| H04L 12/46 | (2006.01) |

(52) U.S. Cl.
CPC ............ *H04L 12/4679* (2013.01); *H04L 49/70* (2013.01)
USPC .......................................... 709/219; 709/238

(58) Field of Classification Search
USPC ........... 209/217, 223, 224; 370/390; 709/238, 709/250, 219, 224–225, 230, 232, 236; 718/1
See application file for complete search history.

(56) References Cited

U.S. PATENT DOCUMENTS

| | | | | |
|---|---|---|---|---|
| 6,018,766 A | * | 1/2000 | Samuel et al. ................ | 709/218 |
| 6,144,661 A | * | 11/2000 | Katsube et al. ............... | 370/390 |
| 7,213,246 B1 | * | 5/2007 | van Rietschote et al. ......... | 718/1 |
| 7,356,818 B2 | * | 4/2008 | Carollo et al. ................ | 718/102 |
| 7,478,173 B1 | * | 1/2009 | Delco ........................... | 709/250 |
| 8,493,839 B2 | * | 7/2013 | Cripe et al. ................... | 370/218 |
| 2002/0031142 A1 | * | 3/2002 | Metin et al. .................... | 370/463 |
| 2002/0097730 A1 | | 7/2002 | Langille et al. | |
| 2003/0169747 A1 | * | 9/2003 | Wang ............................ | 370/400 |
| 2004/0015966 A1 | * | 1/2004 | MacChiano et al. ............. | 718/1 |
| 2004/0267866 A1 | * | 12/2004 | Carollo et al. ................ | 709/200 |

(Continued)

FOREIGN PATENT DOCUMENTS

| | | |
|---|---|---|
| EP | WO0167694 | 9/2001 |
| GB | 2 389 023 | 11/2003 |

(Continued)

OTHER PUBLICATIONS

Figueiredo, R. J. et al., A case for Grid Computing on Virtual Machines, Distributed Computing Systems, 2003. Proceedings. 23rd International Conference on, IEEE, May 22, 2003, pp. 550-559, 10 pgs.

(Continued)

*Primary Examiner* — Joshua Joo
(74) *Attorney, Agent, or Firm* — Blakely, Sokoloff, Taylor & Zafman LLP

(57) ABSTRACT

An apparatus and method for a dynamically extensible virtual switch. An apparatus or virtual switch includes at least one router and a data structure. The router utilizes the data structure to organize a connection between one or more virtual network interface cards (VNICs) to form a virtual network. The virtual switch also identifies a VNIC node of a data frame by its unique identifier, utilizes the unique identifier to index a collection of elements to retrieve a pointer to a virtual network head, and forwards the data frame to all VNIC nodes in a VNIC node listing associated with the virtual network head except for a VNIC node that relates to the unique identifier.

12 Claims, 9 Drawing Sheets

(56) References Cited

U.S. PATENT DOCUMENTS

| | | | |
|---|---|---|---|
| 2005/0131668 A1* | 6/2005 | Traut | 703/22 |
| 2005/0216380 A1* | 9/2005 | Morris et al. | 705/34 |
| 2009/0222558 A1* | 9/2009 | Xu et al. | 718/1 |

FOREIGN PATENT DOCUMENTS

| | | |
|---|---|---|
| GB | 2389023 | 11/2003 |
| JP | 2002-026956 | 1/2002 |
| JP | 2003-204348 | 7/2003 |
| JP | 2003-218915 A | 7/2003 |
| WO | WO 01/67694 | 9/2001 |
| WO | 2005/083946 A1 | 9/2005 |

OTHER PUBLICATIONS

Traversat, B. et al., Project JXTA 2.0 Super-Peer Virtual Network, [online], Sun Micro Systems, May 25, 2003, pp. 1-20, [searched on Jan. 30, 2009], Internet Website <URL:http://research.sun.com/spotlight/misc/jxta.pdf>, 20 pgs.

Zhan, F. B., Three Fastest Shortest Path Algorithms on Real Road Networks: Data Structures and Procedures, JGIDA [online], Jul. 14, 2001, vol. 1, No. 1, pp. 1-21, [searched on Jan. 30, 2009], Internet website <URL: http://teams.gemstone.umd.edu/classof2009/fastr/Zahn%20Article.pdf>, 12 pgs.

Lau et al., "A Packet-Memory-Integrated 44Gb/s Switching Processor with a 10Gb Port and 12Gb ports" ISSCC 2--2/Session 3/Digital Signal Processors and Circuits/3.1 Broadcom Co. San Jose, CA, 3 pages.

International Preliminary Report on Patentability for PCT Patent Application No. PCT/US2005/001602, mailed Aug. 24, 2006, 10 Pages.

International Search Report and Written Opinion for PCT Patent Application No. PCT/US2005/001602, mailed May 13, 2005, 15 Pages.

Office Action Received for Japanese Patent Application No. 2006-553133, mailed Feb. 10, 2009, 2 pages of English Translation. Total—5 pgs.

Office Action Received for Japanese Patent Application No. 2006-553133, mailed Jun. 1, 2010, 1 page of English Translation. Total—2 pgs.

Summary of Office Action Received for Chinese Patent Application No. 200580011224.1 dated Feb. 15, 2008, 3 pages (redacted).

Office Action Received for Chinese Patent Application No. 200580011224.1, mailed May 14, 2010, 3 pages of English Summary. Total—7 pgs.

Office Action received for Japanese Patent Application No. 2006-553133, mailed on Apr. 26, 2011, 3 pages of English Translation and 2 pages of Office Action.

International Search Report and Written Opinion for International Patent Application No. PCT/US2005/001602, Mailed Aug. 26, 2011, 6 pages.

Communication pursuant to Article 94(3) EPC for European Patent Application No. 05711612.1-2416, Mailed Oct. 24, 2011, 3 pages.

* cited by examiner

APPARATUS AND METHOD FOR A DYNAMICALLY EXTENSIBLE VIRTUAL SWITCH

BACKGROUND

A single physical platform may be segregated into a plurality of virtual networks. Here, the physical platform incorporates at least one virtual machine monitor (VMM). A conventional VMM typically runs on a computer and presents to other software the abstraction of one or more virtual machines (VMs). Each VM may function as a self-contained platform, running its own "guest operating system" (i.e., an operating system (OS) hosted by the VMM) and other software, collectively referred to as guest software.

Processes running within a VM are provided with an abstraction of some hardware resources and may be unaware of other VMs within the system. Every VM assumes that it has full control over the hardware resources allocated to it. The VMM is an entity that is responsible for appropriately managing and arbitrating system resources among the VMs including, but not limited to, processors, input/out (I/O) devices and memory.

Network interface card (NIC) virtualization is a technique for providing an abstraction of a physical NIC(s) to the VMs. Through virtualization, the same physical NIC(s) can be shared by multiple VMs. In addition, NIC virtualization allows a VM to be presented with multiple instances of the same physical NIC. For example, a system may have a single physical NIC, but a VM may see multiple virtual NICs (VNICs), each of which interfaces with different networks inside the physical platform and/or the external network to which the physical NIC is attached. In fact, the actual physical NIC does not even have to be present in order to enable inter-VM communication within a system. The VNIC that is presented to a VM may be completely different than the actual physical NIC, thereby making it possible to expose features to the VM that may not exist in the actual physical hardware.

There is a limit on the total number of virtual networks and the maximum number of VMs per virtual network in the single physical platform. In addition, virtual networks cannot be reconfigured at run time of the VMM because it involves moving one or more VMs from one virtual network to another, which requires a restart of the affected VMs and the entire VMM.

A virtual switch may be utilized to provide a switching function for routing information or data frames between the plurality of virtual networks. The virtual switch typically identifies the source VNIC node of a data frame by the MAC address of the VNIC from which the data frame was sent or by the MAC address stored in the data frame itself. Any malicious software (e.g., guest OS running in a VM) can spoof the MAC address and thus cause the receiving node of the data frame to believe it came from a different source VNIC node than the actual source VNIC node from which it came. Spoofing of MAC addresses comprises the integrity of the virtual networks.

BRIEF DESCRIPTION OF THE DRAWINGS

The invention may be best understood by referring to the following description and accompanying drawings that are used to illustrate embodiments of the invention. In the drawings.

DESCRIPTION OF EMBODIMENTS

Figure 1:
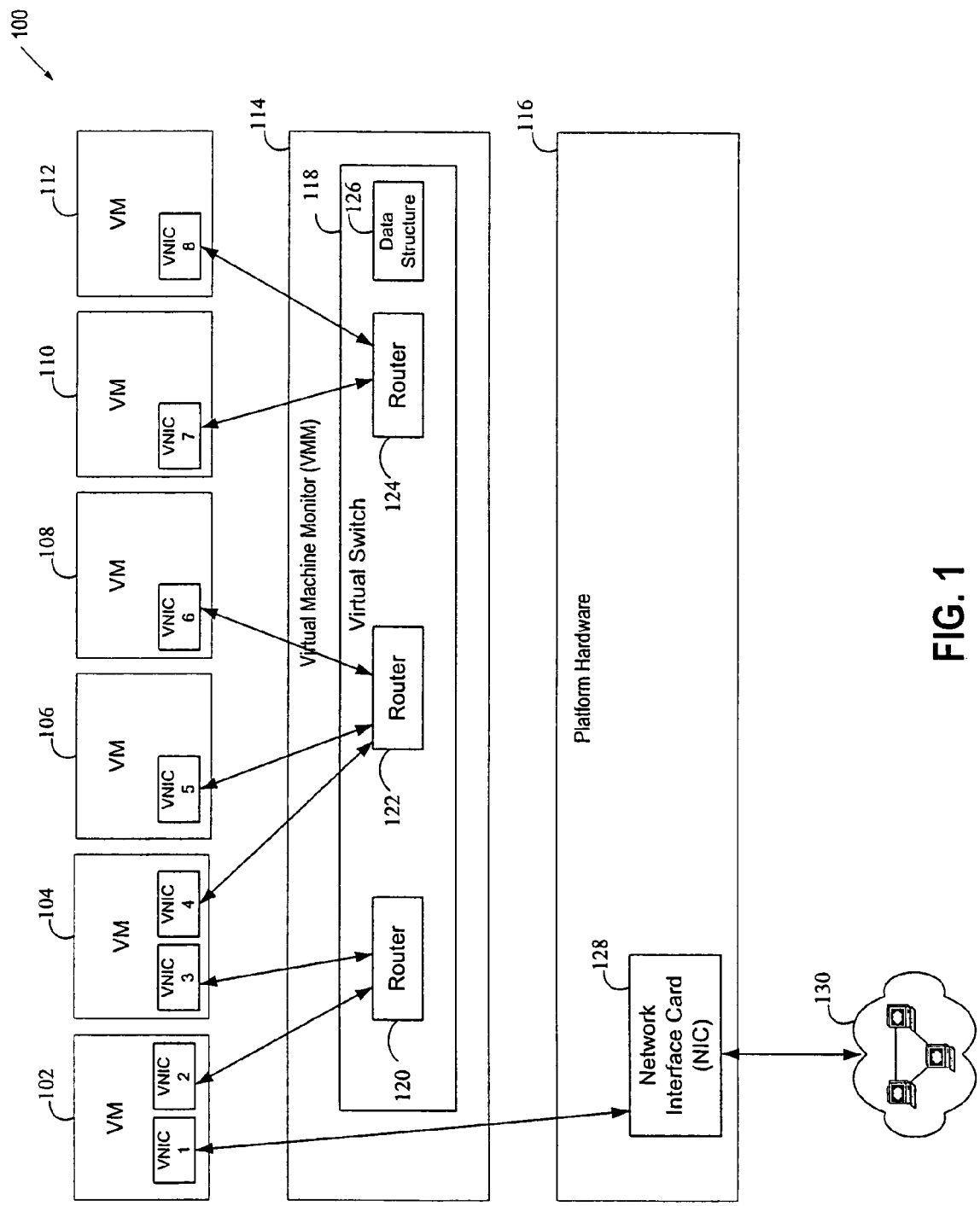
FIG. 1 illustrates one embodiment of a virtual machine environment, in which some embodiments of the present invention may operate.

An apparatus and method for a dynamically extensible virtual switch are described. The virtual switch of the present invention provides the ability to create, delete or reconfigure virtual networks at run time without the need to restart any VM or the VMM. In addition, the virtual switch imposes no fixed limits on the number of VMs that can be connected to any virtual network. The virtual switch also imposes no limit on the total number of virtual networks. Additionally, the virtual switch ensures that no malicious software can compromise the isolation of the virtual networks configured by the VMM administrator. In the following description, for purposes of explanation, numerous specific details are set forth. It will be apparent, however, to one skilled in the art that embodiments of the invention can be practiced without these specific details.

Embodiments of the present invention may be implemented in software, firmware, hardware, or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and hardware components.

Thus, a machine-readable medium may include any mechanism for storing or transmitting information in a form readable by a machine (e.g., a computer). These mechanisms include, but are not limited to, floppy diskettes, optical disks, Compact Disc Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like. Other types of mechanisms may be added or substituted for those described as new types of mechanisms are developed and according to the particular application for the invention.

Some portions of the detailed descriptions that follow are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "processing" or "computing" or "calculating" or "determining" or the like, may refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

FIG. 1 illustrates one embodiment of an environment for the dynamically extensible virtual switch, in which some embodiments of the present invention may operate. The specific components shown in FIG. 1 represent one example of a configuration that may be suitable for the invention and is not meant to limit the invention.

Referring to FIG. 1, the environment 100 for the dynamically extensible virtual switch includes, but is not necessarily limited to, one or more VMs 102 through 112, a VMM 114 and platform hardware 116. Though six VMs are shown in FIG. 1, it is understood that any number of VMs may be present in environment 100. Each of these components is described next in more detail.

VMs 102 through 112 each include one or more VNICs. For example, VM 102 includes VNIC 1 and VNIC 2, whereas VM 106 includes only VNIC 5. Each VNIC in FIG. 1 has a unique ID. For illustration purposes only, assume that VNIC 1 has an ID of 1, VNIC 2 has an ID of 2, VNIC 3 has an ID of 3, and so forth.

NIC virtualization is a technique for providing an abstraction of a physical NIC to the VMs. Through virtualization, the same physical NIC can be shared by multiple VMs. Each VM assumes that it owns the physical NIC. In addition, NIC virtualization allows a VM to be presented with multiple instances of the same physical NIC. For example, a system may have a single physical NIC, but a VM may see multiple VNICs, each of which interfaces with different networks inside the physical machine and/or the external network to which the physical NIC is attached. In an embodiment of the invention, VNIC 1 through 8 is an abstraction of network interface card (NIC) 128 in platform hardware 116.

VMM 114 includes a virtual switch 118. Virtual switch 118 includes a collection of routers 120, 122 and 124 and a data structure 126. Though three routers are shown in FIG. 1, it is understood that any number of routers may be present in virtual switch 118. Routers 120, 122 and 124 use data structure 126 to organize the connections among the VNICs in VMs 102 through 112 to form the various virtual networks, as will be described in more detail below. In an embodiment of the invention, virtual switch 118 is agnostic of the virtualization model used by VMM 114 (e.g., hypervisor, host-based, hybrid, and so forth). Other types of virtualization models may be added or substituted for those described as new types of virtualization models are developed and according to the particular application for the invention.

Platform hardware 116 includes a NIC 128. NIC 128 is connected to a physical network 130. Platform hardware 116 can be of a personal computer (PC), mainframe, handheld device, portable computer, set-top box, or any other computing system. Platform hardware 116 may include one or more processors and memory (not shown in FIG. 1). Additionally, platform hardware 116 may include memory and a variety of other input/output devices (also not shown in FIG. 1).

The processors in platform hardware 116 can be any type of processor capable of executing software, such as hyper-threaded, SMP, multi-core, microprocessor, digital signal processor, microcontroller, or the like, or any combination thereof. Other types of processors may be added or substituted for those described as new types of processors are developed and according to the particular application for environment 100. The processors may include, but are not necessarily limited to, microcode, macrocode, software, programmable logic, hard coded logic, etc., for performing the execution of embodiments for methods of the present invention.

The memory of platform hardware 116 can be any type of recordable/non-recordable media (e.g., random access memory (RAM), read only memory (ROM), magnetic disk storage media, optical storage media, flash memory devices, etc.), as well as electrical, optical, acoustical or other form of propagated signals (e.g., carrier waves, infrared signals, digital signals, etc.), any combination of the above devices, or any other type of machine medium readable by the processors. Other types of recordable/non-recordable media may be added or substituted for those described as new types of recordable/non-recordable are developed and according to the particular application for the invention. Memory may store instructions for performing the execution of method embodiments of the present invention.

In environment 100, the platform hardware 116 comprises a computing platform, which may be capable, for example, of executing a standard operating system (OS) or a virtual machine monitor (VMM), such as a VMM 114. VMM 114, though typically implemented in software, may emulate and export a bare machine interface to higher level software. Such higher level software may comprise a standard or real-time OS, may be a highly stripped down operating environment with limited operating system functionality, or may not include traditional OS facilities. Alternatively, for example, VMM 114 may be run within, or on top of, another VMM. VMMs and their typical features and functionality are well known by those skilled in the art and may be implemented, for example, in software, firmware, hardware or by a combination of various techniques.

In an embodiment of the invention, each router in virtual switch 118, along with its associated VNICs, represent a virtual network. Thus, router 120, VNIC 2 in VM 102 and VNIC 3 in VM 104 represent one virtual network; router 122, VNIC 4 in VM 104, VNIC 5 in VM 106 and VNIC 6 in VM 108 represent a second virtual network; and router 124, VNIC 7 in VM 110 and VNIC 8 in VM 112 represent a third virtual network. VNIC 1 in VM 102 is the only VNIC shown in FIG. 1 that is connected to physical network 130 (via NIC 128). Though four virtual networks are shown in FIG. 1, it is understood that any number of virtual networks may be present in environment 100.

Figure 2:
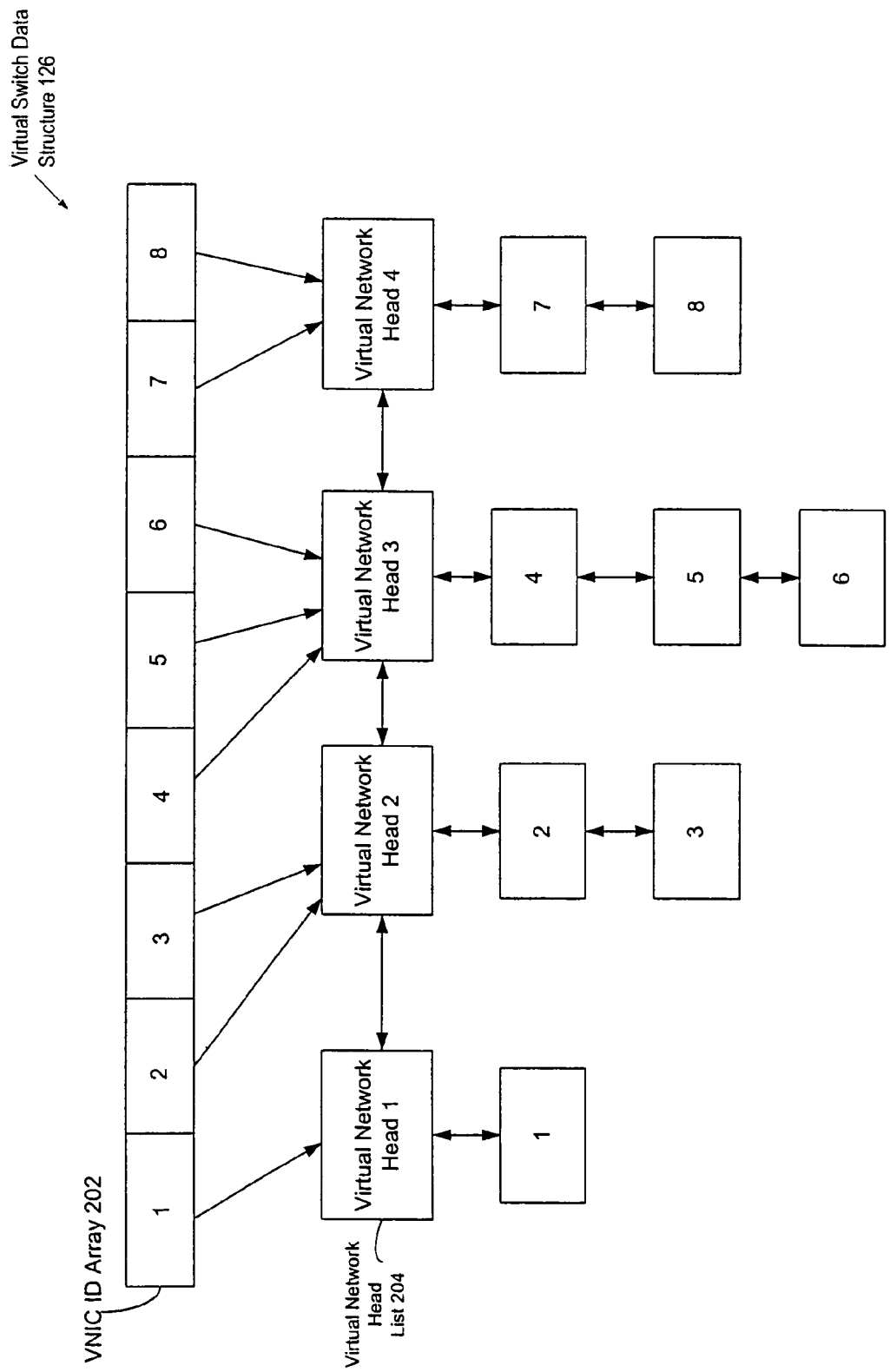
FIG. 2 illustrates a virtual switch data structure according to one embodiment of the present invention.

Virtual switch data structure 126 is further described next with reference to FIG. 2. As described above, routers 120, 122 and 124 use data structure 126 to organize the connections among the VNICs in VMs 102 through 112 to form the various virtual networks in environment 100. Data structure 126 includes a VNIC ID array 202 and a virtual network head list 204. Each of these is described in more detail next.

In an embodiment of the invention, each VNIC in FIG. 1 has a unique ID. For illustration purposes only, assume that VNIC 1 has an ID of 1, VNIC 2 has an ID of 2, VNIC 3 has an ID of 3, and so forth. Each unique VNIC ID serves as an index into the elements of VNIC ID array 202. The elements of VNIC ID array 202 contain pointers to the virtual network heads and the actual VNIC data structures (not shown in FIG. 2). Each virtual network head contains a pointer to a doubly linked list of VNIC nodes. Each VNIC node contains the ID of a VNIC (i.e., index into the elements of VNIC ID array 202).

In an embodiment of the invention, and as described above with reference to FIG. 1, VNIC 1 in VM 102 is the only VNIC that is connected to physical network 130 (via NIC 128). This virtual network is illustrated in FIG. 2 via element 1 in VNIC ID array 202 that contains a pointer to virtual network head 1 (of virtual network head list 204), and via virtual network head 1 that contains a pointer to a doubly linked list of VNIC nodes that contains the ID of 1 (representing VNIC 1).

Also as described above with reference to FIG. 1, router 120, VNIC 2 in VM 102 and VNIC 3 in VM 104 create another virtual network. This virtual network is illustrated in FIG. 2 via the elements 2 and 3 in VNIC ID array 202 that each contain a pointer to virtual network head 2, and via virtual network head 2 that contains a pointer to a doubly linked list of VNIC nodes that contains the IDs of 2 and 3 (representing VNIC 2 and VNIC 3). A similar arrangement is shown in FIG. 2 for the other virtual networks of FIG. 1.

In an embodiment of the invention, virtual switch data structure 126 is used to dynamically perform operations on the virtual networks without restarting VM 102 through 112 and/or VMM 114. These operations include, but are not necessarily limited to, (1) creating a new virtual network; (2) deleting an existing virtual network; (3) adding a VNIC to a particular virtual network; and (4) deleting a VNIC from a particular virtual network. Embodiments of these operations are described next with reference to FIGS. 3-8.

Figure 3:
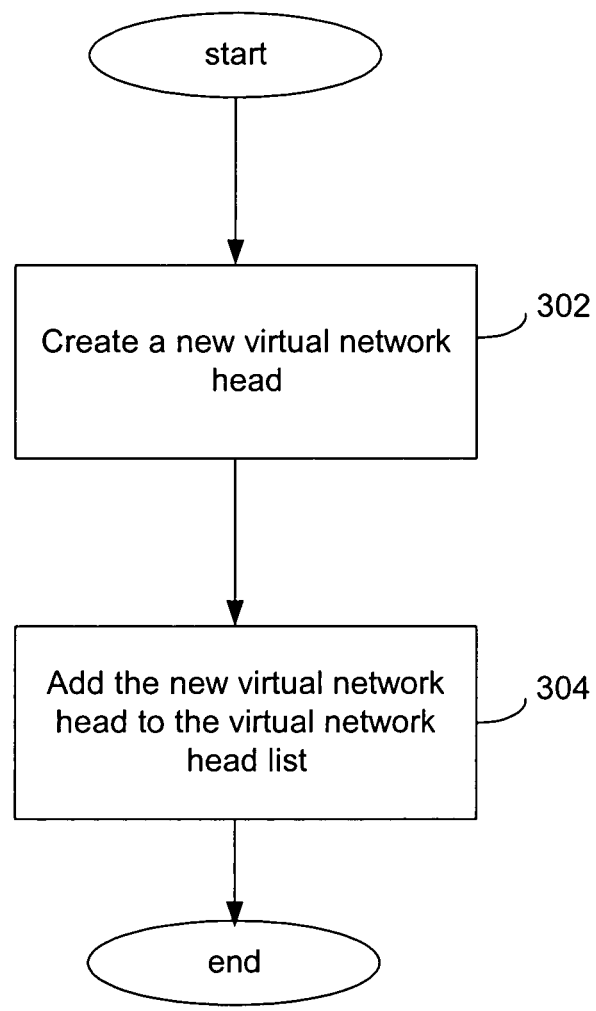
FIG. 3 a flow diagram of one embodiment of a process for creating a new virtual network.

FIG. 3 a flow diagram of one embodiment of a process for creating a new virtual network. Referring to FIG. 3, the process begins at processing block 302 where a new virtual network head is created. At processing block 304, the newly created virtual network head is added to virtual network head list 204. The process of FIG. 3 ends at this point.

Figure 4:
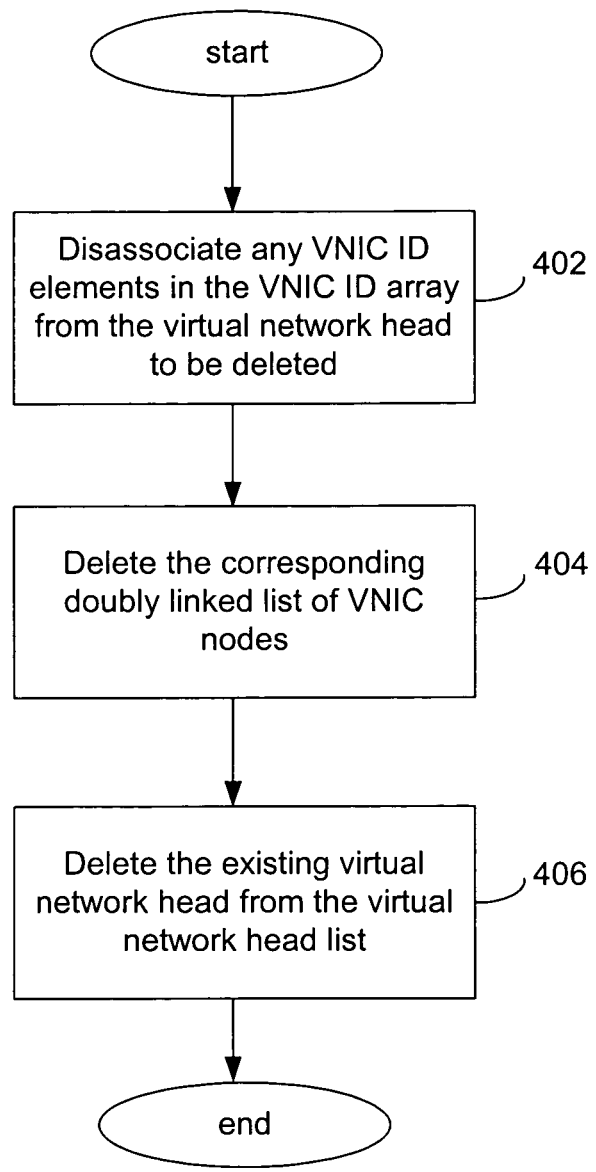
FIG. 4 is a flow diagram of one embodiment of a process for deleting an existing virtual network.
Figure 5:
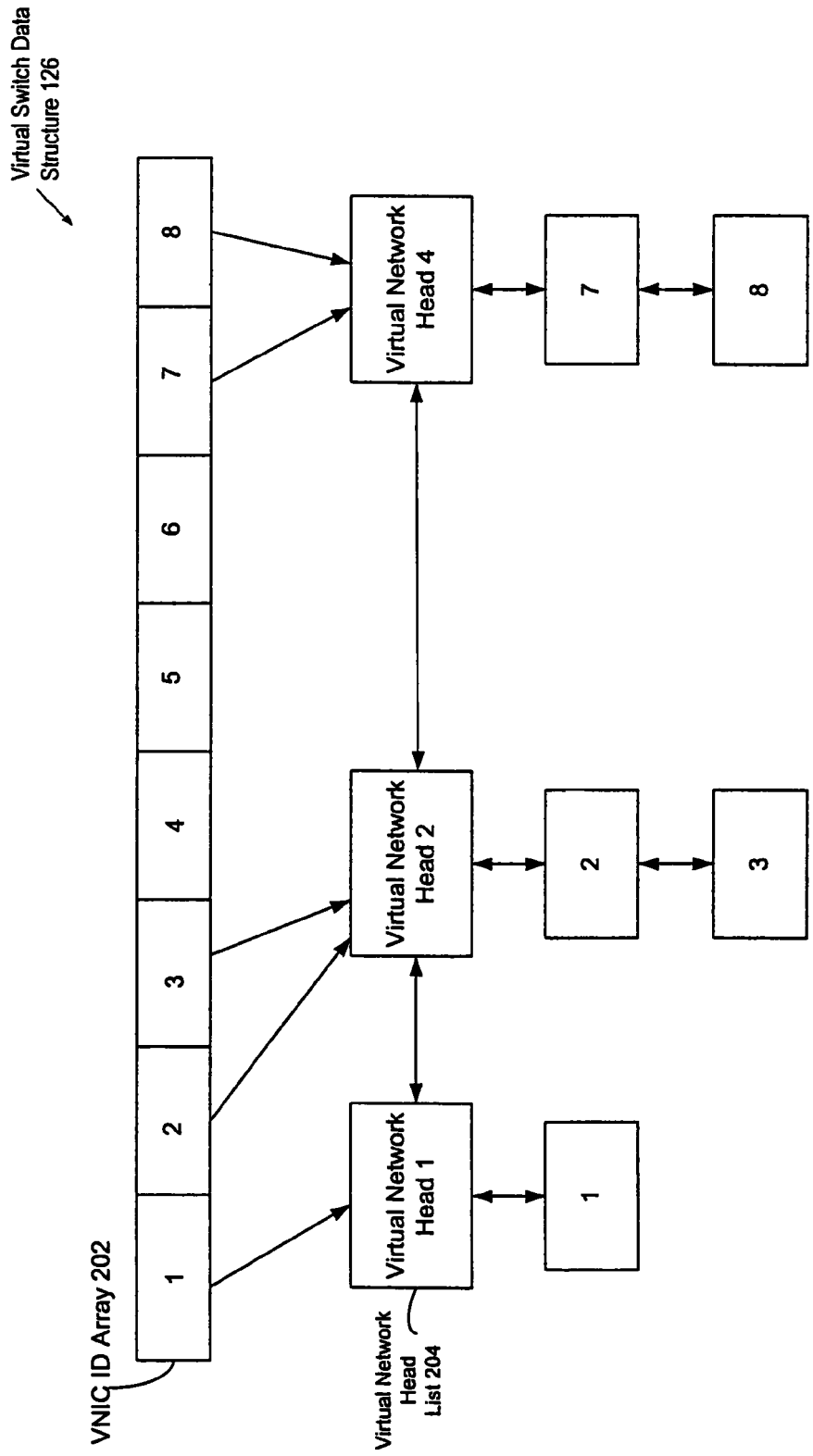
FIG. 5 illustrates the operation of deleting an existing virtual network according to an embodiment of the invention.

FIG. 4 is a flow diagram of one embodiment of a process for deleting an existing virtual network. For illustration purposes only, assume that virtual network 3 is to be deleted from virtual switch data structure 126 of FIG. 2. This illustration is shown in FIG. 5.

Referring to FIG. 4, the process begins at processing block 402 where all VNIC ID elements in VNIC ID array 202 are disassociated from the virtual network head to be deleted. In our illustration, this involves deleting the pointers from elements 4, 5 and 6 of VNIC ID array 202 (as shown in FIG. 5).

At processing block 404, the corresponding doubly linked list of VNIC nodes of the virtual network head to be deleted is deleted. In our illustration, this involves deleting the doubly linked list of VNIC nodes from virtual network head 3 (as shown in FIG. 5).

At processing block 406, the virtual network head is deleted from virtual network head list 204. In our illustration, this involves deleting virtual network head 3 from virtual network head list 204 (as shown in FIG. 5). The process in FIG. 4 ends at this point.

Figure 6:
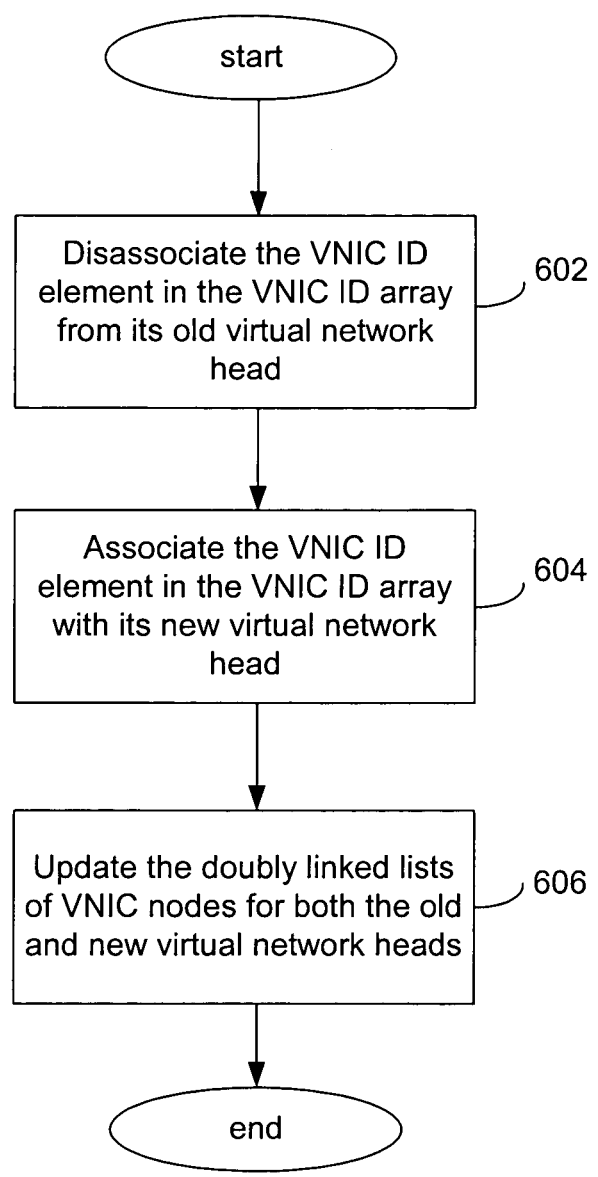
FIG. 6 is a flow diagram of one embodiment of a process for adding a VNIC to a particular virtual network.
Figure 7:
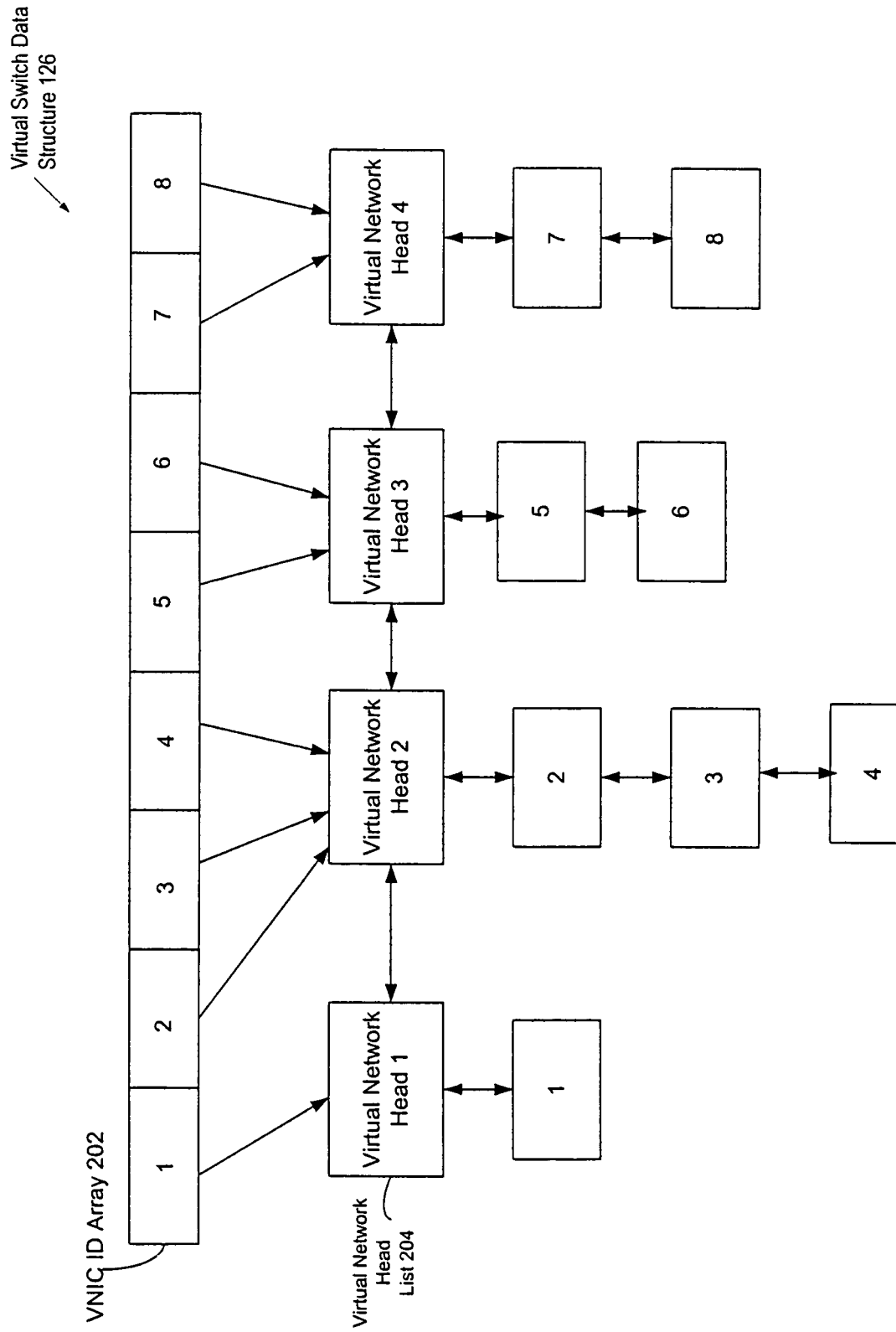
FIG. 7 illustrates the operation of adding a VNIC to a particular virtual network.

FIG. 6 is a flow diagram of one embodiment of a process for adding a VNIC to a particular virtual network. For illustration purposes only, assume that VNIC 4 (element 4 in VNIC ID array 202) is to be added to virtual network 2 of FIG. 2. This illustration is shown in FIG. 7.

Referring to FIG. 6, the process begins at processing block 602 where the VNIC ID element in VNIC ID array 202 is disassociated from its old virtual network head. In our illustration, element 4 is currently associated with virtual network head 3. Thus, the pointer from element 4 to the virtual network head 3 is deleted (as shown in FIG. 7).

In processing block 604, the VNIC ID element in VNIC ID array 202 is associated from its new virtual network head. In our illustration, a pointer is created from element 4 to virtual network head 2 (as shown in FIG. 7).

In processing block 606, the doubly linked lists of VNIC nodes for both the old and new virtual network heads are updated. In our illustration, the VNIC 4 node is deleted from virtual network head 3's doubly linked list and added to virtual network head 2's doubly linked list (as shown in FIG. 7). The process in FIG. 6 ends at this point.

Figure 8:
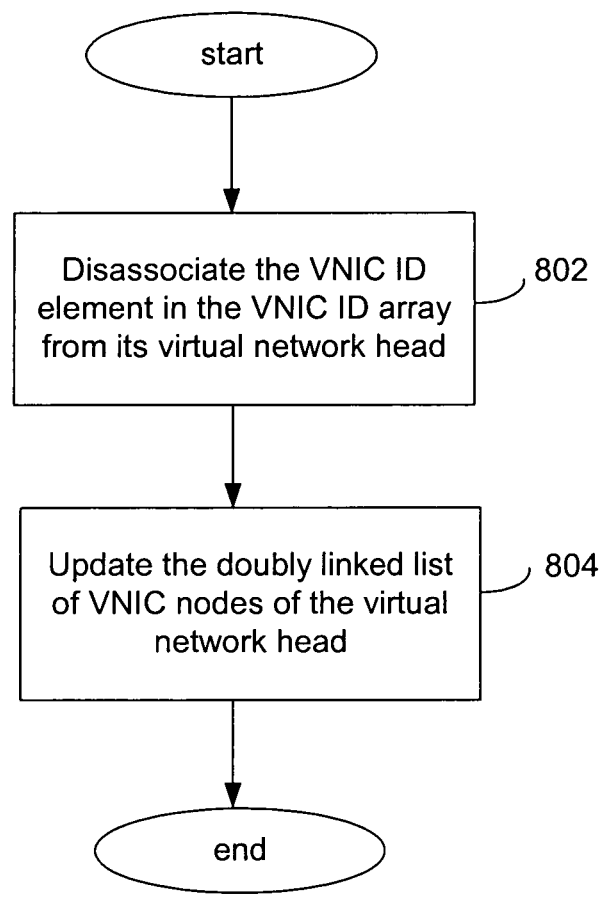
FIG. 8 is a flow diagram of one embodiment of a process for deleting a VNIC from a particular virtual network.

FIG. 8 is a flow diagram of one embodiment of a process for deleting a VNIC from a particular virtual network. Referring to FIG. 8, the process begins at processing block 802 where the VNIC ID element in VNIC ID array 202 is disassociated from its virtual network head.

At processing block 804, the doubly linked list of VNIC nodes of the virtual network head is updated to remove the VNIC node corresponding to the deleted VNIC. The process in FIG. 8 ends at this point.

As described above, a virtual switch may be utilized to provide a switching function for routing information or data frames between the plurality of virtual networks. Existing virtual switches typically identify the source VNIC node of a data frame by the MAC address of the VNIC from which the data frame was sent or by the MAC address stored in the data frame itself. Any malicious software (e.g., guest OS running in a VM) can spoof the MAC address and thus cause the receiving node of the data frame to believe it came from a different source VNIC node than the actual source VNIC node from which it came. Spoofing of MAC addresses compromises the integrity of the virtual networks.

In an embodiment of the present invention, virtual switch 118 overcomes the situation where malicious software may spoof the MAC address by identifying the source VNIC of a data frame by its unique VNIC ID and not by the MAC address. By assigning and using VNIC IDs not visible to the processes running in the VMs, virtual switch 118 ensures that only malicious software that routes data frames based only on MAC addresses can compromise the integrity of the virtual networks.

Figure 9:
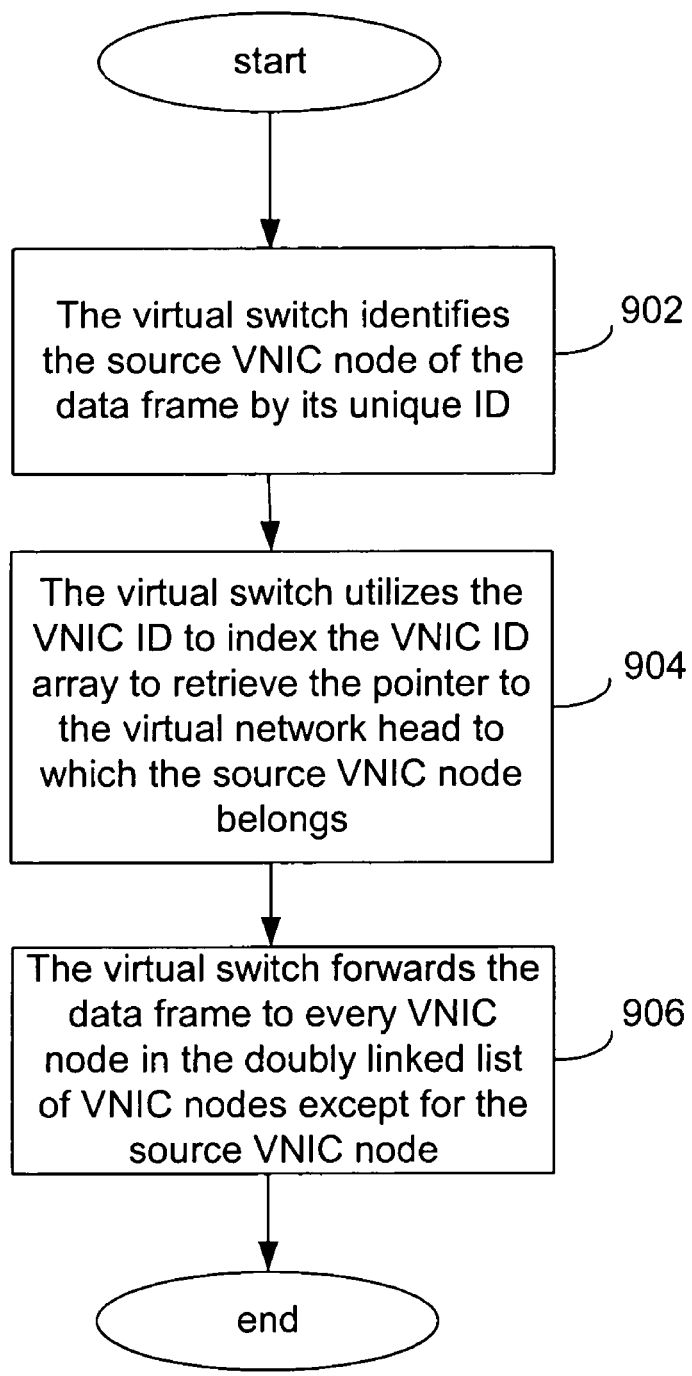
FIG. 9 is a flow diagram of one embodiment of a process for a data frame routing scheme that avoids the possibility of spoofing.

FIG. 9 is a flow diagram of one embodiment of a process for a data frame routing scheme that avoids the possibility of spoofing. Referring to FIG. 9, the process begins at processing block 902 where virtual switch 118 identifies the source VNIC node of the data frame by its unique ID.

At processing block 904, virtual switch 118 utilizes the VNIC ID to index into VNIC ID array 202 to retrieve the pointer to the virtual network head to which the source VNIC node belongs.

At processing block 906, virtual switch 118 forwards the data frame to every VNIC node in the doubly linked list of VNIC nodes except for the source VNIC node. The process of FIG. 9 ends at this point.

An apparatus and method for a dynamically extensible virtual switch have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus, comprising:
    at least one processor and a non-transitory storage medium to provide a virtual switch, the virtual switch comprising at least one router and a data structure;
    wherein the at least one router utilizes the data structure to organize a connection between one or more virtual network interface cards (VNICs) to form a virtual network;
    wherein the one or more VNICs are each located in one or more virtual machines (VMs);
    wherein the one or more VNICs each has a unique identifier distinguishable from a media access control (MAC) address, the unique identifier not visible to any processes running in the corresponding VM; and
    wherein the virtual switch routes a data frame received from a source VNIC of the one or more VNICs using the unique identifier of the source VNIC to identify the source VNIC as the source of the data frame instead of a MAC address of the source VNIC.

2. The apparatus of claim 1, wherein the virtual machine is the same for each of the one or more VNICs.

3. The apparatus of claim 1, wherein the virtual machine is different for each of the one or more VNICs.

4. The apparatus of claim 1, wherein the data structure comprises:
    a collection of elements indexed by the unique identifiers of the one or more VNICs; and
    a virtual network head listing, wherein each element in the collection of elements is associated with a virtual network head in the virtual network head listing, wherein each of the virtual network heads in the virtual network head listing is associated with a VNIC node listing, and wherein each VNIC node in the VNIC node listing contains one of the unique identifiers of the one or more VNICs.

5. The apparatus of claim 4, wherein the collection of elements is an array.

6. The apparatus of claim 4, wherein the VNIC node listing is a doubly linked list of VNIC nodes.

7. A method comprising:
    forming a virtual network via at least one router and a data structure, wherein the at least one router utilizes the data structure to organize a connection between one or more virtual network interface cards (VNICs), and wherein the one or more VNICs each has a unique identifier distinguishable from a media access control (MAC) address, the unique identifier not visible to any processes running in the corresponding VM; and
    routing a data frame received from a source VNIC of the one or more VNICs using the unique identifier of the source VNIC to identify the source VNIC as the source of the data frame instead of a MAC address of the source VNIC;
    wherein the one or more VNICs are each located in a one or more virtual machines (VMs).

8. The method of claim 7, wherein the data structure comprises a collection of elements indexed by the unique identifiers of the one or more VNICs and a virtual network head listing, wherein each element in the collection of elements is associated with a virtual network head in the virtual network head listing, wherein each of the virtual network heads in the virtual network head listing is associated with a VNIC node listing, and wherein each VNIC node in the VNIC node listing contains one of the unique identifiers of the one or more VNICs.

9. The method of claim 8, further comprising creating a new virtual network, wherein creating the new virtual network comprises:
    creating a new virtual network head; and
    adding the new virtual network head to the virtual network head listing.

10. A non-transitory computer readable storage medium containing instructions which cause the processing system to perform a method, the method comprising:
    forming a virtual network via at least one router and a data structure, wherein the at least one router utilizes the data structure to organize a connection between one or more virtual network interface cards (VNICs), and wherein the one or more VNICs each has a unique identifier distinguishable from a media access control (MAC) address, the unique identifier not visible to any processes running in the corresponding VM; and
    routing a data frame received from a source VNIC of the one or more VNICs using the unique identifier of the source VNIC to identify the source VNIC as the source of the data frame instead of a MAC address of the source VNIC;
    wherein the one or more VNICs are each located in a one or more virtual machines (VMs).

11. The non-transitory computer readable storage medium of claim 10, wherein the data structure comprises a collection of elements indexed by the unique identifiers of the one or more VNICs and a virtual network head listing, wherein each element in the collection of elements is associated with a virtual network head in the virtual network head listing, wherein each of the virtual network heads in the virtual network head listing is associated with a VNIC node listing, and wherein each VNIC node in the VNIC node listing contains one of the unique identifiers of the one or more VNICs.

12. The non-transitory computer readable storage medium of claim 11, further comprising creating a new virtual network, wherein creating a new virtual network comprises:
    creating a new virtual network head; and
    adding the new virtual network head to the virtual network head listing.

* * * * *